(12) United States Patent
Liu et al.

(10) Patent No.: US 9,954,898 B2
(45) Date of Patent: Apr. 24, 2018

(54) DATA FLOW FORWARDING METHOD AND DEVICE

(71) Applicant: Hillstone Networks, Corp., Sunnyvale, CA (US)

(72) Inventors: Timothy Liu, Beijing (CN); Zhong Wang, Cupertino, CA (US); Lingling Zhang, San Jose, CA (US); Bin Jia, Beijing (CN)

(73) Assignee: Hillstone Networks, Corp., Sunnyvale, CA (US)

( * ) Notice: Subject to any disclaimer, the term of this patent is extended or adjusted under 35 U.S.C. 154(b) by 0 days.

(21) Appl. No.: 14/449,109

(22) Filed: Jul. 31, 2014

(65) Prior Publication Data

US 2016/0036856 A1   Feb. 4, 2016
US 2017/0070535 A9   Mar. 9, 2017

(30) Foreign Application Priority Data

Jun. 17, 2013 (CN) .......................... 2013 1 0239522

(51) Int. Cl.
*H04L 29/06* (2006.01)

(52) U.S. Cl.
CPC .......... *H04L 63/20* (2013.01); *H04L 63/0263* (2013.01); *H04L 63/10* (2013.01)

(58) Field of Classification Search
CPC . G06F 21/31; G06F 21/445; G06F 2221/2129
USPC .............................................. 726/1
See application file for complete search history.

(56) References Cited

U.S. PATENT DOCUMENTS

| | | | | |
|---|---|---|---|---|
| 7,882,538 B1* | 2/2011 | Palmer | .................... | G06F 21/31 713/150 |
| 7,886,335 B1* | 2/2011 | Chickering | ......... | H04L 43/0817 726/1 |
| 8,065,712 B1* | 11/2011 | Cheng | ................... | H04L 63/105 726/1 |
| 2006/0259980 A1* | 11/2006 | Field | ....................... | G06F 21/51 726/27 |

(Continued)

FOREIGN PATENT DOCUMENTS

| | | | | |
|---|---|---|---|---|
| CN | 1620034 A | | 5/2005 | |
| CN | 201310239522 | * | 6/2013 | ............. H04L 29/06 |

OTHER PUBLICATIONS

Foreign Office Action dated Feb. 26, 2016 for Chinese Appln. No. 201310239522.2.

(Continued)

*Primary Examiner* — Harunur Rashid
(74) *Attorney, Agent, or Firm* — Vista IP Law Group, LLP

(57) ABSTRACT

This disclosure makes public a data flow forwarding method and device, and in this method, a second health state is acquired based on the first health state of one or more pieces of identifying information of the received data flow, wherein the first health state and second health state are associated with the access rights of the user and/or user device that sent the data flow; it employs firewall policy property sets to determine whether or not to forward the data flow, wherein the firewall policy property sets comprise: the second health state. The technical schemes based on this disclosure improve the ability of a firewall to identify network attacks or abnormal activities and reduce administration costs.

18 Claims, 2 Drawing Sheets

(56) References Cited

U.S. PATENT DOCUMENTS

| 2007/0124803 A1* | 5/2007 | Taraz ................... G06F 21/577 |
| | | 726/4 |
| 2008/0082662 A1* | 4/2008 | Dandliker ............... H04L 63/10 |
| | | 709/225 |
| 2010/0077445 A1* | 3/2010 | Schneider ............... G06F 21/52 |
| | | 726/1 |
| 2010/0192196 A1* | 7/2010 | Lee ........................ G06F 21/55 |
| | | 726/1 |

OTHER PUBLICATIONS

Foreign Office Action dated Jul. 30, 2015 for Chinese Appln. No. 201310239522.2.

* cited by examiner

DATA FLOW FORWARDING METHOD AND DEVICE

RELATED APPLICATION DATA

This application claims priority to and the benefit of Chinese Patent Application No. 201310239522, filed on Jun. 17, 2013. The entire disclosure of the above application is expressly incorporated by reference herein.

TECHNICAL FIELD

This disclosure relates to the communications field. More specifically, it relates to a data flow forwarding method and device.

BACKGROUND ART

The firewall policies or Access Control List (ACL) of today's technologies can use the lower level properties of a data flow to determine whether or not to permit the data flow to pass through. Under normal circumstances, the lower level properties on which the firewall policy is based can include but are not limited to at least one of the following: source address, source port, destination address, destination port, protocol number, and application type. Ingress interface and egress interface are often a part of the properties on which a firewall policy is based.

With the rapid development of science and technology, domestic and foreign firms are including more factors in firewall policies. For example: some firms have included the concept of security zones—that is, using ingress interface security zones or egress interface security zones to determine whether or not to permit a data flow to pass through; some firms are gradually introducing the concept of user-based access control or role-based access control (RBAC) to the existing firewall policy foundation; and some firms have introduced the concept of authentication groups to the existing firewall policy foundation, first matching the detected data flow to the lower level properties on which the firewall policy is based (including: source address, source port, destination address, destination port, and protocol number), then using matching authentication to determine the subgroup to which this data flow belongs, and finally using the first match principle to judge whether or not to permit the data flow to pass through.

Below, we use two specific application examples to further describe the firewall policies of the related technologies.

Embodiment 1

Table 1 is Embodiment 1 of a user-based access control firewall policy based on related technologies. As shown in Table 1, we assume that the security gateway of Firm A has a dual function: a firewall and a Secure Sockets Layer (SSL) Virtual Private Network (VPN). When a user connects from a public network through the SSL VPN, the firm's internal system can assign an SSL role to the traffic from this user, and for those engineers connecting remotely, the firm's internal system assigns an engineer role to such users.

In addition, there are two types of personal computers (PCs) in the firm's Intranet: one type is specially provided for engineers, and its address group is Eng IPs; the other type is used by everyone other than engineers, and its address group is Other-IPs. In addition, the firm also has three servers: the email server, Intranet server, and Eng server.

TABLE 1

| group | source address | source port | destination address | destination port | protocol | action |
|---|---|---|---|---|---|---|
| SSL | Any | Any | Intranet_Server | Any | Any | not permitted |
| Engineer | Any | Any | Eng_Server | Any | Any | permitted |
| Any | Eng_IPs | Any | Any | Any | Any | permitted |
| Any | Any | Any | Email_Server | Any | Any | permitted |

According to Table 1, we see that users connecting remotely are not permitted to access the Intranet Server, engineers may access the Eng server whether they are employing a remote connection mode or internal access mode, engineers may access all servers on the Intranet using an Intranet PC, and others may access the email server to check their email whether they are employing a remote connection mode or internal access mode. This shows that, in this application example, there is the separate, special control of users connecting through SSL and users of the Engineering group.

However, there are flaws in this application example: when the security state of one user is affected by specific reasons, the systems accessed by the user might need to grant this user a variety of different access rights. And the specific reasons are often multi-faceted, and can include the security state of the device currently used by the user, an abnormal application used by the user, and abnormal behavior by the user. Taking secure access factors and the user's private information into consideration, it is possible to constantly create new roles. For example: assuming that there are N users or user groups and M security states, it is necessary to produce M×N roles. However, the constant creation of new roles is highly inconvenient for the administration of a firm's internal systems, and it also increases the cost of administration. Looking at it from another angle, if a network administrator wishes to conduct visual management of the user initiating the access, ascertaining the factors influencing the security policy of every user in real time, this requires a directly observed presentation. When a user initiates access, the desire for visual management can be drowned out by the constant evolution of user roles because the user's role is constantly changing.

Embodiment 2

Network Access Control (NAC) technology is a secure access technology during connection. This technology is commonly used in switches. When a user connects to a network from a PC, the switch will detect the PC's virus protection software version, available patches, browser setting restrictions, and valid personal firewall. Only after this PC passes through a series of the switch's detections is it permitted to connect to the network. If the PC does not meet all of these requirements, the switch does not permit it to connect to the network. Under specified circumstances, the PC can be partitioned to a Virtual Local Area Network (VLAN) for online repairs.

However, there are flaws with this application example: NAC security detection is based on the security state of the PC device. In network security devices, the identification of network attacks or abnormal activities is achieved through the network's data traffic, and it is not possible to make firewall policy adjustments according to an overall risk assessment of the user.

SUMMARY

This disclosure provides a data flow forwarding method and device, in order to solve, at the very least, the problem in related technologies of the firewall policy's lack of a data flow health assessment.

Based on one aspect of this disclosure, a data flow forwarding method is provided.

The data flow forwarding method based on this disclosure comprises: acquiring the second health state of the data flow based on the first health state of one or more pieces of identifying information of the received data flow, wherein the first health state and second health state are associated with the access rights of the user and/or user device that sent the data flow; it employs firewall policy property sets to determine whether or not to forward the data flow, wherein the firewall policy property sets comprise: the second health state.

Preferably, the second health state of the data flow is acquired based on the first health state of one or more pieces of identifying information, comprising: looking up the one or more pieces of identifying information, and the health state corresponding to every piece of identifying information, in the current health assessment database; and selecting the poorest health level and determining the second health state, wherein there is a linear correlation between health level and access rights.

Preferably, prior to looking up one or more pieces of identifying information and their corresponding health levels in the health assessment database, it also comprises: separately conducting health scoring for each of the one or more pieces of identifying information; acquiring the health levels corresponding to the ranges to which the health scoring results belong; and storing every piece of identifying information and the health levels corresponding to the identifying information in the health assessment database.

Preferably, it employs firewall policy property sets to determine whether or not to forward the data flow, comprising: looking up the one or more firewall policy records corresponding to the data flow in the firewall policy table, based on the second health state; employing the properties in the firewall policy property sets, aside from the second health state, to conduct matching of the one or more firewall policy records, one at a time; and forwarding the data flow according to the data flow's matching firewall policy records if matching is successful.

Preferably, the firewall policy property sets also comprise at least one of the following: the data flow's Internet protocol IP 5-tuple information; the source port or security zone sending the data flow; the destination port or destination security zone receiving the data flow; and the user information, user group information, or user role information sending the data flow.

Preferably, the identifying information comprises at least one of the following: the source IP address and/or destination IP address of the data flow; the subgroup to which the source IP address and/or destination IP address of the data flow belong; the application program corresponding to the data flow; the user information, user group information, or user role information sending the data flow; the source port or security zone sending the data flow; and the destination port or destination security zone receiving the data flow.

A data flow forwarding device is provided, based on an aspect of this disclosure.

The data flow forwarding device based on this disclosure comprises: an acquisition module, used to acquire the second health state of the data flow based on the first health state of one or more pieces of identifying information of the received data flow, wherein the first health state and second health state are associated with the access rights of the user and/or user device that sent the data flow; and a determination module, used to employ firewall policy property sets to determine whether or not to forward the data flow, wherein the firewall policy property sets comprise: the second health state.

Preferably, the acquisition module comprises: a first lookup element, used to look up the one or more pieces of identifying information, and the health state corresponding to every piece of identifying information, in the current health assessment database; and a selection element, used to select the poorest health level and determine the second health state, wherein there is a linear correlation between health level and access rights.

Preferably, the acquisition module also comprises: a scoring element, used to separately conduct health scoring for each of the one or more pieces of identifying information; an acquisition element, used to acquire the health levels corresponding to the ranges to which the health scoring results belong; and a storage element, used to store every piece of identifying information and the health levels corresponding to the identifying information in the health assessment database.

Preferably, the determination module comprises: a second lookup element, used to look up the one or more firewall policy records corresponding to the data flow in the firewall policy table, based on the second health state; a matching element, used to employ the properties in the firewall policy property sets, aside from the second health state, and conduct matching of the one or more firewall policy records, one at a time; and a forwarding element, used to forward the data flow according to the data flow's matching firewall policy records when there is successful matching in the matching element.

Through this disclosure, the second health state of the data flow is acquired based on the first health state of one or more pieces of identifying information of the received data flow, and the first health state and second health state are associated with the access rights of the user and/or user device that sent the data flow; it employs firewall policy property sets to determine whether or not to forward the data flow, and these firewall policy property sets comprise: the second health state. A data flow health assessment has been added to the firewall policy property sets, and so it solves the problem of the firewall policy's lack of a data flow health assessment in related technologies, improves the ability of a firewall to identify network attacks or abnormal activities, and reduces administration costs.

A data flow forwarding method includes: based on first health state(s) of one or more pieces of identifying information of a received data flow, determining a second health state of the data flow using a processing unit, wherein the first health state(s) and second health state are associated with the an access right of a user and/or an access right of a device that sent the data flow; and employing a set of firewall policy parameters to determine whether or not to forward the data flow, wherein at least one of the firewall policy parameters has a value that represents the second health state.

Optionally, the one or more pieces of indentifying information comprises a plurality of pieces of identifying information; wherein the first health state(s) comprises a plurality of first health states of the respective pieces of identifying information; and wherein the act of determining the second health state of the data flow comprises: looking up the plurality of pieces of identifying information, and the first health states corresponding to the respective pieces of identifying information, in a health assessment database; selecting one of the first health states that represents the poorest health level; and determining the second health state based on a result of the act of selecting.

Optionally, the method further includes: prior to the act of looking up the plurality of pieces of identifying information and their corresponding first health states in the health assessment database: determining health scores for the respective pieces of identifying information; determining the first health states for the respective pieces of identifying information based on the respective health scores, wherein each of the first health states corresponds to a range of health scores that includes the corresponding health score of the corresponding piece of identifying information; and storing the pieces of identifying information and the corresponding first health states in the health assessment database.

Optionally, the one or more pieces of indentifying information comprises only one piece of identifying information; wherein the first health state(s) comprises one first health state of the one piece of identifying information; and wherein the act of determining the second health state of the data flow comprises: looking up the one piece of identifying information, and the first health state corresponding to the one piece of identifying information, in a health assessment database; and determining the second health state based on the first health state corresponding to the one piece of identifying information.

Optionally, the act of employing the set of firewall policy parameters to determine whether or not to forward the data flow comprises: looking up one or more firewall policy records corresponding to the data flow in a firewall policy table based on the second health state; employing one or more of the firewall policy parameters in the set, aside from the second health state, to conduct a matching of the one or more firewall policy records; and if a result of the matching is successful, forwarding the data flow according to the data flow's matching firewall policy record(s).

Optionally, the set of firewall policy parameters comprises at least one of the following: Internet protocol IP 5-tuple information of the data flow; a source port or a security zone sending the data flow; a destination port or a destination security zone receiving the data flow; and user information, user group information, or user role information, associated with an entity sending the data flow.

Optionally, the identifying information comprises at least one of the following: a source IP address and/or a destination IP address of the data flow; a subgroup to which the source IP address and/or the destination IP address of the data flow belongs; an application program corresponding to the data flow; user information, user group information, or user role information, associated with an entity sending the data flow; a source port or a security zone sending the data flow; and a destination port or a destination security zone receiving the data flow.

Optionally, the second health state represents one of a plurality of health levels, and there is a linear correlation between the health levels and access rights.

A data flow forwarding device includes: an acquisition module configured to, based on first health state(s) of one or more pieces of identifying information of a received data flow, determine a second health state of the data flow, wherein the first health state(s) and second health state are associated with an access right of a user and/or an access right of a user device, that sent the data flow; a determination module configured to employ a set of firewall policy parameters to determine whether or not to forward the data flow, wherein at least one of the firewall policy parameters has a value that represents the second health state.

Optionally, the one or more pieces of indentifying information comprises a plurality of pieces of identifying information; wherein the first health state(s) comprises a plurality of first health states of the respective pieces of identifying information; and wherein that the acquisition module comprises: a first lookup element configured to look up the plurality of pieces of identifying information, and the first health states corresponding to the respective pieces of identifying information, in a health assessment database; and a selection element configured to select one of the first health states that represents the poorest health level, and determine the second health state based on the selected one of the first health states.

Optionally, in that the acquisition module also comprises: a scoring element configured to determine health scores for the respective pieces of identifying information; an acquisition element configured to determine the first health states for the respective pieces of identifying information based on the respective health scores, wherein each of the first health states corresponds to a range of health scores that includes the corresponding health score of the corresponding piece of identifying information; and a storage element configured to store the pieces of identifying information and the corresponding first health states in the health assessment database.

Optionally, the one or more pieces of indentifying information comprises only one piece of identifying information; wherein the first health state(s) comprises one first health state of the one piece of identifying information; and wherein that the acquisition module comprises: a first lookup element configured to look up the one piece of identifying information, and the first health state corresponding to the one piece of identifying information, in a health assessment database; and a selection element configured to determining the second health state based on the first health state corresponding to the one piece of identifying information.

Optionally, the determination module comprises: a second lookup element configured to look up one or more firewall policy records corresponding to the data flow in a firewall policy table based on the second health state; a matching element configured to employ one or more of the firewall policy parameters in the set, aside from the second health state, to conduct a matching of the one or more firewall policy records; and a forwarding element configured to forward the data flow according to the data flow's matching firewall policy record(s) when a result of the matching is successful.

Optionally, the set of firewall policy parameters comprises at least one of the following: Internet protocol IP 5-tuple information of the data flow; a source port or a security zone sending the data flow; a destination port or a destination security zone receiving the data flow; and user information, user group information, or user role information, associated with an entity sending the data flow.

Optionally, the identifying information comprises at least one of the following: a source IP address and/or a destination IP address of the data flow; a subgroup to which the source IP address and/or the destination IP address of the data flow belongs; an application program corresponding to the data flow; user information, user group information, or user role information, associated with an entity sending the data flow;

a source port or a security zone sending the data flow; and a destination port or a destination security zone receiving the data flow.

Optionally, the second health state represents one of a plurality of health levels, and there is a linear correlation between the health levels and access rights.

A computer product includes a non-transitory medium storing a set of instructions, an execution of which causes a data flow forwarding method to be performed, the method comprising: based on first health state(s) of one or more pieces of identifying information of a received data flow, determining a second health state of the data flow using a processing unit, wherein the first health state(s) and second health state are associated with the an access right of a user and/or an access right of a device that sent the data flow; and employing a set of firewall policy parameters to determine whether or not to forward the data flow, wherein at least one of the firewall policy parameters has a value that represents the second health state.

Other and further aspects and features will be evident from reading the following detailed description.

DESCRIPTION OF ATTACHED FIGURES

The attached figures described here are used to give a further understanding of this disclosure, and they constitute a part of this application. The illustrative embodiments of this disclosure and their descriptions are used to explain this disclosure and do not serve as improper limitations of this disclosure. Of the attached figures.

DETAILED DESCRIPTION OF EMBODIMENTS

Figure 1:
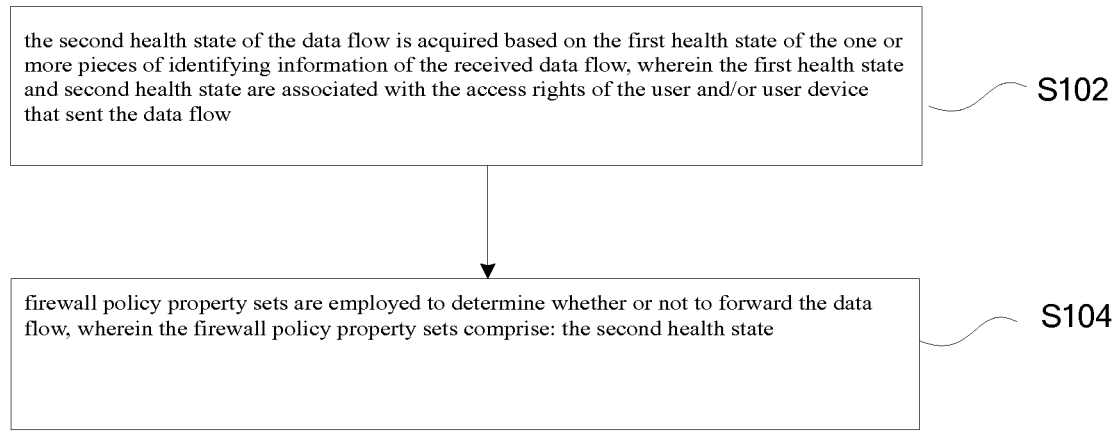
FIG. 1 is a flow diagram of the data flow forwarding method based on the embodiments of this disclosure.

The following text refers to the attached figures and, in combination with the embodiments, gives a detailed description of this disclosure. It should be noted that, where there is no conflict, the embodiments of this application and the characteristics of the embodiments can be combined.

Various embodiments are described hereinafter with reference to the figures. It should be noted that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

In the following description, unless otherwise noted, the symbolic representations of the actions and operations executed by one or more computers are referred to in order to describe each embodiment of this application. Here, the computers can include a variety of products, such as personal computers, servers, and mobile terminals; any device with a processor chip, such as a CPU, single chip microprocessor, or DSP, can be called a computer. Therefore, we see that, at times, these actions and operations executed by what we call a computer comprise the electric signal operation of the computer's processing element on a structural expression of data. This operation forwards data or keeps it in a location in the computer's memory. This uses a mode understood by those skilled in the art to reconfigure or change the computer's operations. The data structure of the maintenance data is the physical location in the memory of the specified properties defined by the data's format. However, even though this disclosure is described in the preceding context, it does not constitute a limitation. As is understood by those skilled in the art, the actions and operations described below can be implemented with hardware.

Turning now to the attached figures, their shared labels refer to the same elements, and the principles of this application are viewed as being implemented in a suitable computing environment. The embodiments based on this application are described below; they should not be viewed as limiting this application with regard to alternative embodiments not described here.

The following embodiments can be applied to computers, such as PCs. They can also be applied to mobile terminals using smart operating systems, but are not limited to these. There are no special requirements for computers or mobile terminal operating systems; all that is needed is that they be able to detect contact, determine whether or not this contact conforms to preset rules, and carry out the corresponding functions based on the properties of the contact.

FIG. 1 is a flow diagram of the data flow forwarding method based on the embodiments of this disclosure. As shown in FIG. 1, this method can comprise the following processing steps:

Step S102: Acquiring the second health state of the data flow based on the first health state of one or more pieces of identifying information of the received data flow, wherein the first health state and second health state are associated with the access rights of the user and/or user device that sent the data flow;

Step S104: Employing firewall policy property sets to determine whether or not to forward the data flow, wherein the firewall policy property sets comprise: the second health state.

In the related technologies, firewall policies lack an assessment of data flow health. Using the method shown in FIG. 1, the second health state of the data flow is acquired based on the first health state of one or more pieces of identifying information of the received data flow, and the first health state and second health state are associated with the access rights of the user and/or user device that sent the data flow; it employs firewall policy property sets to determine whether or not to forward the data flow, and these firewall policy property sets comprise: the second health state. A data flow health assessment has been added to the firewall policy property sets, and so it solves the problem of the firewall policy's lack of a data flow health assessment in related technologies, improves the ability of a firewall to identify network attacks or abnormal activities, and reduces administration costs.

In the preferred implementation process, the firewall policy property sets can comprise but are not limited to at least one of the following:

(1) the data flow's Internet protocol IP 5-tuple information;

(2) the source port or security zone sending the data flow;

(3) the destination port or destination security zone receiving the data flow;

(4) the user information, user group information, or user role information sending the data flow.

In the preferred implementation process, the identifying information can comprise but is not limited to at least one of the following:
  (1) the source IP address and/or destination IP address of the data flow;
  (2) the subgroup to which the source IP address and/or destination IP address of the data flow belong;
  (3) the application program corresponding to the data flow;
  (4) the user information, user group information, or user role information sending the data flow;
  (5) the source port or security zone sending the data flow;
  (6) the destination port or destination security zone receiving the data flow.

In the preferred embodiment, a health assessment database can be established, wherein the assessment objects of the health assessment database are one or more pieces of identifying information of the data flow. More specifically, they can comprise but are not limited to at least one of the following: the source IP address and/or destination IP address of the data flow, the subgroup to which the source IP address and/or destination IP address of the data flow belong, the user information, user group information, or user role information sending the data flow, the application program corresponding to the data flow (one or more IP address and port), the source port or security zone sending the data flow, and the destination port or destination security zone receiving the data flow. All of the objects in the health assessment database can be regularly updated.

Preferably, in Step S102, the acquisition of the second health state of the data flow based on the first health state of one or more pieces of identifying information can comprise the following steps:

Step S1: Looking up the one or more pieces of identifying information, and the health state corresponding to every piece of identifying information, in the current health assessment database;

Step S2: Selecting the poorest health level and determining the second health state, wherein there is a linear correlation between health level and access rights.

In the preferred embodiment, there can be a linear correlation between health level and access rights. That is, we assume that health level is x and access rights is y; therefore, y=kx or y=−kx, wherein k is a positive integer. Using y=kx as an example, health states can be divided into N levels, and they can comprise: Level 1 for a healthy state, Level N for an unhealthy state, and Levels 2 . . . N−1 for subhealthy states of varying degrees. From this we deduce that the higher the health level, the lower the access rights. Therefore, Level N is the poorest health level.

Let us assume that the data flow $M_j$ currently being received by the firewall has k pieces of identifying information, and they are the assessment objects of the health assessment database. They are: $M_{j1}$, $M_{j2}$ . . . $M_{jk}$, and the health levels corresponding to every assessment object (piece of identifying information) are: Health ($M_{j1}$), Health ($M_{j2}$) . . . Health ($M_{jk}$). From this, we can arrive at the following calculation formula:

$$\text{Health}(M_j)=\text{Max}(\text{Health}(M_{j1}), \text{Health}(M_{j2}), \ldots, \text{Health}(M_{jk}))$$

The health status of this data flow is determined by the one of the abovementioned objects with the highest health level (that is, the poorest health level).

Preferably, in Step S1, prior to looking up the one or more pieces of identifying information and their corresponding health levels in the health assessment database, the following operations can be included:

Step S3: Separately conducting health scoring for each of the one or more pieces of identifying information;

Step S4: Acquiring the health levels corresponding to the ranges to which the health scoring results belong;

Step S5: Storing every piece of identifying information and the health levels corresponding to the identifying information in the health assessment database.

In the preferred embodiment, it is possible to set up health scoring—that is, a mapping relationship can be established between different ranges of health scores and different health levels. For example: we assume that current health assessments are divided into 3 levels—Level 1 is a healthy state, Level 2 is a subhealthy state, and Level 3 is an unhealthy state; in addition, we can set up a scoring mechanism, and using a scoring scale of 0-100 as an example, it is possible to divide it into 3 ranges and set up a mapping relationship between these ranges and the different health states—that is, 80-100 corresponds to a healthy state, 20-79 corresponds to a subhealthy state, and 0-19 corresponds to an unhealthy state. This shows that a scoring scale can serve as a visualized health assessment method of greater granularity.

It should be noted that the preceding scoring mode is only a preferred implementation of this disclosure and does not constitute a limitation of this disclosure. Any scoring mode capable of ensuring that the health state of every data flow is determined by its piece of identifying information with the poorest health (that is, with the highest health level) can be employed by this disclosure.

Preferably, in Step S104, the employment of firewall policy property sets to determine whether or not to forward the data flow can comprise the following steps:

Step S6: Looking up the one or more firewall policy records corresponding to the data flow in the firewall policy table, based on the second health state;

Step S7: Employing the properties in the firewall policy property sets, aside from the second health state, to conduct matching of the one or more firewall policy records, one at a time;

Step S8: If matching is successful, forwarding the data flow according to the data flow's matching firewall policy records.

A firewall often uses "linked list array" organization and management flow; this "linked list array" is often called a "flow table". Using Transfer Control Protocol (TCP) packets as an example, the firewall can often employ the IP 5-tuple (source IP address, destination IP address, source port, destination port, and IP protocol number) to identify the TCP flow. Every time a TCP packet is received, the firewall can parse this TCP packet, then extract the source IP address, destination IP address, source port, destination port, and IP protocol number from the header and pass the 5-tuple through a HASH operation, thus obtaining HASH operation results, serving as the index of the "flow table". There is a "flow" record linked table in the location where the "flow table's" index value is the abovementioned HASH operation result. In other words, every node of this linked table is a "flow" record, and every one of the "flow's" 5-tuple HASH operation results is the same as the abovementioned HASH operation results. The firewall can conduct matching of the 5-tuple of this TCP packet to the 5-tuple recorded in every node of the linked table. If there is a match, it means that the "flow" to which this packet belongs already exists; otherwise, once the firewall determines that this TCP packet meets the conditions for creating a new connection, it will create a "flow" and add it to the "flow" linked table in the location where the index value of the "flow table" is the abovementioned HASH operation result, in order to record the context environment of the connection to which this packet belongs. This being the case, the firewall needs to recreate a "flow" record packet, often called a "first packet". Of course, in the process of matching the abovementioned TCP packet to the firewall policy, in addition to using the IP 5-tuple (source IP address, destination IP address, source port, destination port, and IP protocol number), it is also possible to use one or more of the following lower level properties on which the policy is based to conduct comprehensive matching:

(1) source interface or security zone;
(2) destination interface or destination security zone;
(3) user or user group or role.

As a preferred embodiment of this disclosure, on the foundation of lower level property sets on which the firewall policy is based, the technical schemes provided by this disclosure can also include health state properties for further matching.

In this preferred embodiment, first of all, all objects corresponding to the received data flow are looked up in the health assessment database. For example: this data flow belongs to user $T_1$ and application $T_2$, wherein the source IP address and/or destination IP address belong to IP group $T_3$; next, because the health state of this data flow is determined by the object with the poorest health state (i.e.: the highest health level) of the abovementioned objects, the following formula can be used to calculate the health state result for this data flow S:

Health(S)=Max(Health($T_1$),Health($T_2$),Health($T_3$)).

From this we see that the lower level properties on which the firewall policy provided by this disclosure is based can comprise but are not limited to at least one of the following:

(1) health state (comprising: N health levels);
(2) IP 5-tuple (source IP address, destination IP address, source port, destination port, and IP protocol number);
(3) source interface or security zone;
(4) destination interface or destination security zone;
(5) user or user group or role;
(6) an action, comprising one of the following: permission, rejection, flow restriction, and connection limit.

If there is a change in the health level of one or more of the objects in the abovementioned health assessment database, it is necessary to conduct another round of policy matching with the flow record in the flow table corresponding to the one or more objects experiencing the change.

It should be noted that the flow table set up in the firewall is primarily used for high-speed forwarding in network data traffic. If, for the currently received data flow, it is not possible to find a matching flow record in the flow table, it is necessary to conduct a lookup in the firewall policy table to determine whether or not to establish a corresponding flow record and then insert it into the flow table. And when a firewall policy record corresponding to the received data flow is found in the firewall policy table, it is possible to first conduct health state information matching, then conduct matching for the other property information (for example: IP 5-tuple information); of course, it is also possible to simultaneously conduct matching for multiple types of property information.

Together with the preferred embodiments shown in Table 2 and Table 3, the following gives a more detailed description of the abovementioned preferred implementation process.

Table 2 is a comparison table for the health state assessment objects and health states based on the preferred embodiments of this disclosure. As shown in Table 2, when there are four PCs in the current network (PC1, PC2, PC3 and PC4), and using the example of IP address for the health state assessment object (that is, the source IP address identifying information of the data flow), the source IP address of PC1 is 10.0.0.1, the source IP address of PC2 is 10.0.0.2, the source IP address of PC3 is 10.0.0.3, and the source IP address of PC4 is 10.0.0.4.

According to dynamic health state detection results: PC1 with a source IP address of 10.0.0.1 and PC4 with a source IP address of 10.0.0.4 are healthy state, PC2 with a source IP address of 10.0.0.2 is subhealthy state, and PC3 with a source IP address of 10.0.0.3 is unhealthy state.

TABLE 2

| object (source IP address) | health state |
|---|---|
| 10.0.0.1 | healthy |
| 10.0.0.2 | subhealthy |
| 10.0.0.3 | unhealthy |
| 10.0.0.4 | healthy |

Table 3 is a firewall policy information table based on Table 2, according to the preferred embodiments of this disclosure. As shown in Table 3, the firewall policy is as follows:

TABLE 3

| healthy state | user/ group | source address | source port | destination address | destination port | protocol | action |
|---|---|---|---|---|---|---|---|
| unhealthy | Any | Any | Any | Internet | Any | Any | permitted |
| unhealthy | Any | Any | Any | Any | Any | Any | not permitted |
| healthy | Finance | Any | Any | ERP_Svr | Any | Any | permitted |
| healthy, subhealthy | Any | Any | Any | Email_Svr | Any | Any | permitted |

Table 3 shows that PC3, in an unhealthy state, is only permitted to access the Internet and is not permitted to access the other servers; PC2, in a subhealthy state, can only access the Email Server; PC1 and PC4, an a healthy state, can access the Email Server, and Finance user groups can access the ERP Server.

This shows that there can be different access rights for the 4 PCs based on their health states. When attack detection or another type of detection influencing health state scoring/health state in the network causes a change in PC health state, correspondingly, the PCs can be assigned new access rights due to the change in health state.

Figure 2:
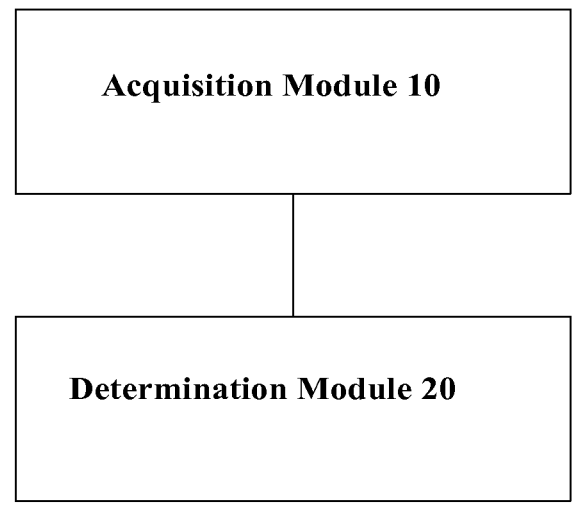
FIG. 2 is a structural block diagram of the data flow forwarding device based on the embodiments of this disclosure.

FIG. 2 is a structural block diagram of the data flow forwarding device based on the embodiments of this disclosure. As shown in FIG. 2, this data flow forwarding device may comprise: an acquisition module 10, used to acquire the second health state of the data flow based on the first health state of one or more pieces of identifying information of the received data flow, wherein the first health state and second health state are associated with the access rights of the user and/or user device that sent the data flow; and a determination module 20, used to employ firewall policy property sets to determine whether or not to forward the data flow, wherein the firewall policy property sets comprise: the second health state.

Figure 3:
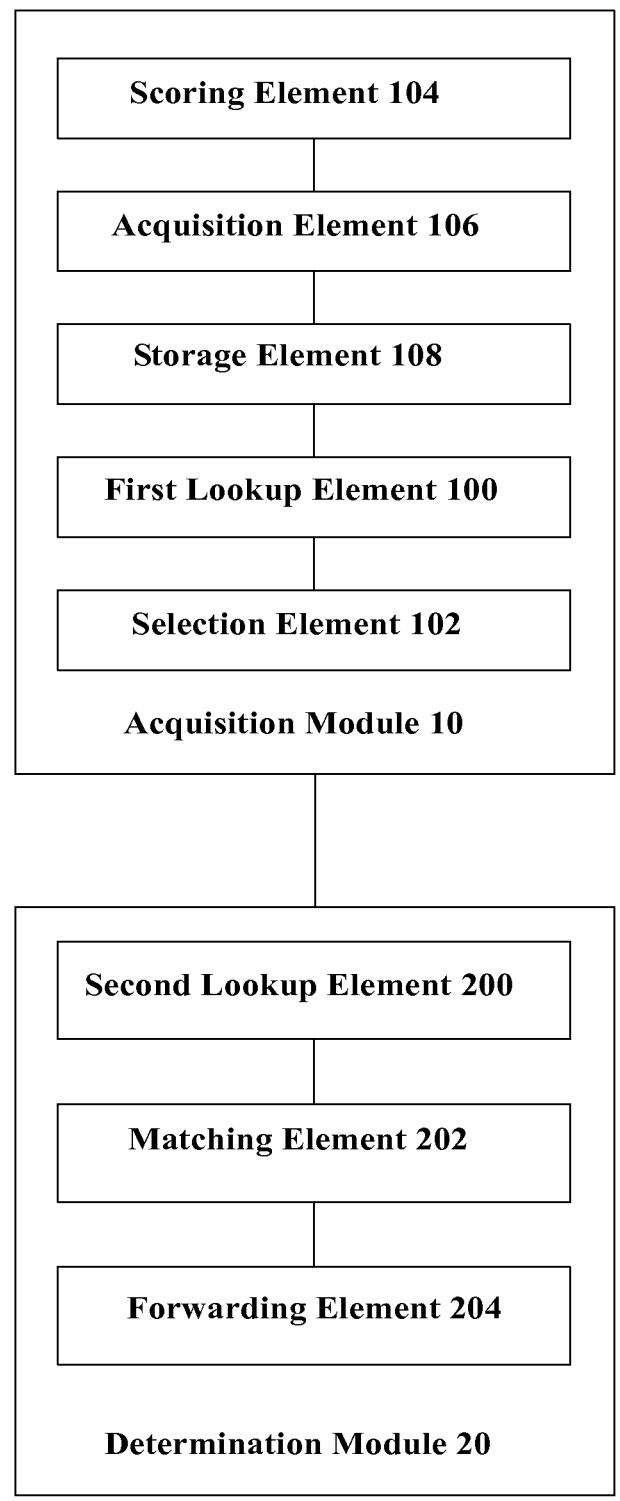
FIG. 3 is a structural block diagram of the data flow forwarding device based on the preferred embodiments of this disclosure.

Using the device shown in FIG. 2 solves the problem of the firewall policy's lack of a data flow health assessment in related technologies, improves the ability of a firewall to identify network attacks or abnormal activities, and reduces administration costs Preferably, as shown in FIG. 3, an acquisition module 10 may comprise: a first lookup element 100, used to look up the one or more pieces of identifying information, and the health state corresponding to every piece of identifying information, in the current health assessment database; and a selection element 102, used to select the poorest health level and determine the second health state, wherein there is a linear correlation between health level and access rights.

Preferably, as shown in FIG. 3, the acquisition module 10 may also comprise: a scoring element 104, used to separately conduct health scoring for each of the one or more pieces of identifying information; an acquisition element 106, used to acquire the health levels corresponding to the ranges to which the health scoring results belong; and a storage element 108, used to store every piece of identifying information and the health levels corresponding to the identifying information in the health assessment database.

Preferably, as shown in FIG. 3, the determination module 20 may comprise: a second lookup element 200, used to look up the one or more firewall policy records corresponding to the data flow in the firewall policy table, based on the second health state; a matching element 202, used to employ the properties in the firewall policy property sets, aside from the second health state, to conduct matching of the one or more firewall policy records, one at a time; and a forwarding element 204, used to forward the data flow according to the data flow's matching firewall policy records when there is successful matching in the matching element.

From this description, we see that the above embodiments achieve the following technical effects (it should be noted that these effects can be achieved by certain preferred embodiments): The technical scheme provided by this disclosure can support health state-based access control, adopting different control modes for traffic of varying risks. In addition, the security control mode can be dynamically adjusted as risks change. Health state serves as a general evaluation of risk. It can effectively separate the risk assessment process from risk-based control, and can dynamically increase or reduce the risk assessment items without influencing the firewall policy configuration, for greater ease of system administration. The addition of a health state/security state control firewall policy can preserve the natural ordering of the original firewall policy and the first match principle, achieving compatibility with the existing firewall policy.

Clearly, a person skilled in the art should understand that the modules or steps of this disclosure can be achieved using general-purpose computing devices, they can be integrated in a single computing device, or they can be dispersed in a network of multiple computing devices. Optionally, they can be achieved through computing device-executable programming code, and this can be stored in a memory device and executed by a computing device. In addition, under certain circumstances, they can be achieved by executing the steps in a sequence other than that shown or described, or turning the steps into separate integrated circuit modules, or turning the multiple modules or steps into a single integrated circuit module. Thus, this disclosure is not limited to any given hardware or software combination.

The preceding is only the preferred embodiment of this disclosure, and is not to be used to limit this disclosure. A person skilled in the art may make a variety of alterations and changes to this disclosure. Any modifications, equivalent substitutions, or improvements made to this disclosure shall fall within the scope of protection of this disclosure, provided that they remain within the spirit and principles of the disclosure.

The invention claimed is:

1. A data flow forwarding method, comprising:
   obtaining first health states corresponding to respective pieces of identifying information of a data flow;
   determining a second health state of the data flow, wherein the second health state is determined using a processing unit, wherein the first health states and/or the second health state is associated with an access right of a user and/or is associated with an access right of a device that sent the data flow; and
   employing a set of firewall policy parameters to determine whether or not to forward the data flow, wherein at least one of the firewall policy parameters has a value that represents the second health state;
   wherein the act of obtaining the first health states corresponding to the respective pieces of identifying information of the data flow comprises electronically receiving the first health states from a database; and
   wherein the act of determining the second health state of the data flow comprises:
      selecting, by the processing unit, one of the first health states that represents the poorest health level; and
      determining, by the processing unit, the second health state of the data flow based on a result of the act of selecting.

2. The method of claim 1, further comprising:
   prior to the act of looking up the plurality of pieces of identifying information and their corresponding first health states:
      determining health scores for the respective pieces of identifying information;
      determining the first health states for the respective pieces of identifying information based on the respective health scores, wherein each of the first health states corresponds to a range of health scores that includes the corresponding health score of the corresponding piece of identifying information; and
      storing the pieces of identifying information and the corresponding first health states.

3. The method of claim 1, wherein the act of employing the set of firewall policy parameters to determine whether or not to forward the data flow comprises:
   looking up one or more firewall policy records corresponding to the data flow in a firewall policy table based on the second health state;
   employing one or more of the firewall policy parameters in the set, aside from the second health state, to conduct a matching of the one or more firewall policy records; and
   if a result of the matching is successful, forwarding the data flow according to the data flow's matching firewall policy record(s).

4. The method of claim 1, wherein the set of firewall policy parameters comprises:
   Internet protocol IP 5-tuple information of the data flow;
   a source port or a security zone sending the data flow;
   a destination port or a destination security zone receiving the data flow;
   user information, user group information, or user role information, associated with an entity sending the data flow; or
   any combination of the foregoing.

5. The method of claim 1, wherein at least one of the pieces of identifying information comprises:
   a source IP address and/or a destination IP address of the data flow;

a subgroup to which the source IP address and/or the destination IP address of the data flow belongs;

an application program corresponding to the data flow;

user information, user group information, or user role information, associated with an entity sending the data flow;

a source port or a security zone sending the data flow; or a destination port or a destination security zone receiving the data flow.

6. The method of claim 1, wherein the second health state represents one of a plurality of health levels, and there is a linear correlation between the health levels and access rights.

7. The method of claim 1, wherein at least one of the pieces of identifying information comprises a header information, and wherein one of the first health states indicates a health of an item represented by the header information.

8. A data flow forwarding device, comprising:

an acquisition module configured to, obtain first health states corresponding to respective pieces of identifying information of a received data flow, and determine a second health state of the data flow, wherein the first health states and/or the second health state is associated with an access right of a user and/or is associated with an access right of a user device that sent the data flow;

a determination module configured to employ a set of firewall policy parameters to determine whether or not to forward the data flow, wherein at least one of the firewall policy parameters has a value that represents the second health state;

wherein each of the acquisition module and the determination module is at least partially implemented using hardware;

wherein the acquisition module is configured to electronically receive the first health states corresponding to the respective pieces of identifying information of the data flow from a database; and wherein the acquisition module is configured to determine the second health state of the data flow by:

selecting one of the first health states that represents the poorest health level, and determining the second health state of the data flow based on a result of the act of selecting.

9. The device of claim 8, wherein in that the acquisition module also comprises:

a scoring element configured to determine health scores for the respective pieces of identifying information;

an acquisition element configured to determine the first health states for the respective pieces of identifying information based on the respective health scores, wherein each of the first health states corresponds to a range of health scores that includes the corresponding health score of the corresponding piece of identifying information; and a storage element configured to store the pieces of identifying information and the corresponding first health states.

10. The device of claim 8, wherein the determination module comprises:

a lookup element configured to look up one or more firewall policy records corresponding to the data flow in a firewall policy table based on the second health state;

a matching element configured to employ one or more of the firewall policy parameters in the set, aside from the second health state, to conduct a matching of the one or more firewall policy records; and a forwarding element configured to forward the data flow when a result of the matching is successful.

11. The device of claim 8, wherein the set of firewall policy parameters comprises:

Internet protocol IP 5-tuple information of the data flow;

a source port or a security zone sending the data flow;

a destination port or a destination security zone receiving the data flow;

user information, user group information, or user role information, associated with an entity sending the data flow; or any combination of the foregoing.

12. The device of claim 8, wherein one of the pieces of identifying information comprises:

a source IP address and/or a destination IP address of the data flow;

a subgroup to which the source IP address and/or the destination IP address of the data flow belongs;

an application program corresponding to the data flow;

user information, user group information, or user role information, associated with an entity sending the data flow;

a source port or a security zone sending the data flow; or a destination port or a destination security zone receiving the data flow.

13. The device of claim 8, wherein the second health state represents one of a plurality of health levels, and there is a linear correlation between the health levels and access rights.

14. A computer product having a non-transitory medium storing a set of instructions, an execution of which causes a data flow forwarding method to be performed, the method comprising:

obtaining first health states corresponding to respective pieces of identifying information of a received data flow;

determining a second health state of the data flow, wherein the second health state is determined using a processing unit, wherein the first health states and/or the second health state is associated with the an access right of a user and/or is associated with an access right of a device that sent the data flow; and employing a set of firewall policy parameters to determine whether or not to forward the data flow, wherein at least one of the firewall policy parameters has a value that represents the second health state;

wherein the act of obtaining the first health states corresponding to the respective pieces of identifying information of the data flow comprises electronically receiving the first health states from a database; and wherein the act of determining the second health state of the data flow comprises:

selecting, by the processing unit, one of the first health states that represents the poorest health level; and determining, by the processing unit, the second health state of the data flow based on a result of the act of selecting.

15. The computer product of claim 14, wherein the act of employing the set of firewall policy parameters to determine whether or not to forward the data flow comprises:

looking up one or more firewall policy records corresponding to the data flow in a firewall policy table based on the second health state;

employing one or more of the firewall policy parameters in the set, aside from the second health state, to conduct a matching of the one or more firewall policy records; and if a result of the matching is successful, forwarding the data flow according to the data flow's matching firewall policy record(s).

16. The computer product of claim 14, wherein the set of firewall policy parameters comprises:
   Internet protocol IP 5-tuple information of the data flow;
   a source port or a security zone sending the data flow;
   a destination port or a destination security zone receiving the data flow;
   user information, user group information, or user role information, associated with an entity sending the data flow; or
   any combination of the foregoing.

17. The computer product of claim 14, wherein at least one of the pieces of identifying information comprises:
   a source IP address and/or a destination IP address of the data flow;
   a subgroup to which the source IP address and/or the destination IP address of the data flow belongs;
   an application program corresponding to the data flow;
   user information, user group information, or user role information, associated with an entity sending the data flow;
   a source port or a security zone sending the data flow; or
   a destination port or a destination security zone receiving the data flow.

18. The computer product of claim 14, wherein the second health state represents one of a plurality of health levels, and there is a linear correlation between the health levels and access rights.

\* \* \* \* \*